United States Patent Office 3,242,228
Patented Mar. 22, 1966

3,242,228
HYDROCARBON ISOMERIZATION PROCESS AND CATALYST
Michael D. Riordan, Fishkill, and John H. Estes, Wappingers Falls, N.Y., assignors to Texaco Inc., New York, N.Y., a corporation of Delaware
No Drawing. Filed Dec. 7, 1962, Ser. No. 242,886
8 Claims. (Cl. 260—683.68)

This invention relates to a hydrocarbon conversion process and, more particularly, to a process and catalyst for the isomerization of isomerizable hydrocarbons. In accordance with this invention, an isomerizable hydrocarbon is contacted under isomerizing conditions with a platinized alumina activated by contact with a chloride activating agent and heat treating.

Our catalyst is prepared by compositing platinum with alumina forming a composite comprising a major portion of alumina and about 0.01 to 1.0 percent by weight platinum. This composite is contacted with a chloride activating agent, for example, carbon tetrachloride, chloroform, methylene chloride, phosgene, and trichloroacetyl chloride, at a temperature within the range of about 300 to 600° F. forming a chlorided composite containing within the range of about 3.0 to 10.0 percent by weight chlorine. This chlorided composite is heated to a temperature within the range of about 400 to 1,000° F. effecting removal of a part of the chlorine content forming a catalyst containing within the range of about 2.5 to 7.0 weight percent chlorine. The resulting chloride activated and heat-treated catalyst is highly active in the isomerization of paraffin hydrocarbons at a temperature within the range of about 200 to 400° F., at a liquid hourly space velocity within the range of about 0.5 to 2.0 and with a hydrogen to hydrocarbon mol ratio within the range of about 0.10:1 to 5.0:1.

Highly active isomerization catalysts prepared by the activation of a platinized alumina composite with a chlorohydrocarbon or an acid chloride are described in application S.N. 102,668 and application S.N. 102,641 both filed April 13, 1961, and now abandoned. These catalysts are prepared by adding platinum to alumina in an amount within the range of about 0.01 to about 1.0 weight percent of the calcined alumina. The platinum is added by any of various well known methods including, for example, impregnation with a water-soluble platinum containing compound such as chloroplatinic acid, or precipitation of platinum as sulfide by passing hydrogen sulfide through an aqueous solution of a platinum compound. The platinum-alumina composite is then activated by treatment with a chloride activating agent under conditions effective to react at least a portion of said activating agent with at least one component of said composite. Chloride activating agents include chlorohydrocarbons, for example, chloroalkanes and alkyl chlorides, and organic chlorides, for example, acid chlorides. Chloride activating agents used in the process of this invention include chloroalkanes and acid chlorides having an atomic ratio of chlorine to carbon of at least 2 to 1, for example, carbon tetrachloride, chloroform, methylene chloride, phosgene, and trichloroacetyl chloride. Carbon tetrachloride is a preferred activating agent since it not only produces a catalyst of high activity, but also provides the greatest amount of chlorine for a given weight of reagent, it is relatively inexpensive, and is easily handled.

In accordance with this method of activation, the platinum-alumina composite is contacted with a chloride activating agent in an amount within the range of about 3.0 to 15.0 percent by weight of the platinum-alumina composite. The chloride-platinum-alumina mixture is activated at a temperature of at least 300° F. and preferably within the range of about 300 to 600° F. The catalyst thus prepared has a high activity for the isomerization of hydrocarbons, for example, butane, normal pentane and hexanes, and gasoline hydrocarbon fractions. The activated catalyst prepared in accordance with this method may be in pellet, granular, bead, or pulverulent form to facilitate its use in fixed beds, moving beds, or fluidized solids beds as is well known in the art.

We have found that the chloride activated platinized alumina catalyst may be stabilized and its activity further enhanced by a heat-treatment. In accordance with our method of heat-treatment, we displace any of the chloride activating agent remaining in contact with the activated catalyst and subject the activated catalyst to heat-treatment at a temperature within the range of about 400 to 1,000° F. The heat-treatment is continued for a period of about 2 to 10 hours. During this heat-treatment, gases are evolved from the catalyst comprising predominately hydrogen chloride together with minor amounts of carbon dioxide and other acidic gases.

The heat-treatment may be effected under either static conditions or a stream of gas may be passed through the catalyst to assist in displacing the evolved gases and provide uniform flow of heat through the system. Hydrogen chloride gas is preferred for this purpose. A flow of hydrogen chloride gas of about .010 to .015 volume per minute per volume of catalyst readily displaces evolved volatile materials for the catalyst. Because of the corrosive nature of hydrogen chloride and the gases evolved from the catalyst upon heating, the heat-treatment is preferably effected in glass or ceramic lined equipment to prevent equipment corrosion and contamination of the catalyst. After heat-treatment, the hydrogen chloride may be displaced with an inert gas for example dry nitrogen or dry air preferably before cooling below about 400° F. The catalyst may be stored indefinitely in dry air or nitrogen. The chloride content of the chloride activated catalyst prior to heat-treatment is within the range of about 3.0 to 10.0 percent by weight. After the heat-treating process the chlorine content of the catalyst is within the range of about 2.5 to 7.0 weight percent chlorine. Surprisingly this removal of a part of the activating chlorine is accompanied not by a loss in activity but by an increase in initial catalyst activity. Additionally, the heat-treated catalyst has greater resistance to deactivation when used for the isomerization of isomerizable hydrocarbons.

The heat-treated chloride-activated isomerization catalyst is highly active at relatively low temperatures. Gasoline fractions, for example, light straight run gasoline and natural gasoline, are treated at temperatures of about 200 to 350° F. and preferably within the range of about 250 to 280° F. Hydrocarbon streams consisting chiefly of pentanes and hexanes are isomerized at temperatures within the range of about 250 to 350° F. and preferably within the range of about 280 to 300° F. Butane isomerization is effected at temperatures within the range of 300 to 400° F. and preferably within the range of 315 to 350° F. Isomerization may be effected in either the liquid or vapor phase. Pressure has been found to have little effect in our process, other than determining whether liquid or vapor phase conditions prevail, and pressures within the range of 300 to 500 pounds per square inch gauge have been found convenient. A liquid hourly space velocity, that is the volume of liquid charged per hour per volume of catalyst, within the range of about 0.5 to 2.0 and preferably within the range of about 0.75 to 1.5 is employed. Hydrogen is included in the isomerization feed in a mol ratio of hydrogen to hydrocarbon within the range of about 0.10:1 to 5:1 and preferably within the range of about 2:1 to 3:1 for hexanes and 0.1:1 to 1:1 for butanes.

*Example A*

A catalyst base is prepared by calcining beta alumina trihydrate forming eta alumina. Platinum in an amount of 0.6 weight percent is deposited on the eta alumina from a solution of chloroplatinic acid. The platinized eta alumina composite is contacted with carbon tetrachloride vapor at 500° F. forming a chloride activated platinized eta alumina containing 5.3 weight percent chlorine. A portion of this activated platinized alumina catalyst is employed for the isomerization of normal butane at the following conditions:

Liquid hourly space velocity _____ 0.5
Temperature, ° F. _____ 335
Pressure, pounds per sq. in. gauge _____ 500
Hydrogen to hydrocarbon mol ratio _____ 0.2

The isomerization product is found to contain 60.1 percent isobutane with fresh catalyst. In a life run, the catalyst deactivation rate is found to be expressed by the following equation:

$$y = 60.1 - 2.4x$$

where $y$ = volume percent isobutane in the product, and
$x$ = total charge expressed as barrels of normal butane per pound of catalyst.

*Example B*

A second portion of the activated platinized alumina composite used in Example A is heated at a temperature of 1,000° F. for two hours after the carbon tetrachloride treatment. A gas comprising about 95 volume percent hydrogen chloride is evolved. The chloride content of the heat-treated catalyst 4.3 weight percent. This heat-treated catalyst is found to have a much higher activity than the catalyst of Example A in that a product containing 60.1 percent isobutane is obtained with fresh catalyst at a liquid hourly space velocity of 2.0 and at the same temperature, pressure, and hydrogen to hydrocarbon mol ratio employed in Example A. The catalyst deactivation rate for the heat-treated catalyst is found to be expressed by the following equation:

$$y = 60.1 - 0.72x$$

Comparison with Example A shows that the greater activity of the heat-treated chloride activated catalyst permits a throughput rate four times greater at the same conditions and initial yield of isomerized product. Surprisingly, the more active heat-treated catalyst, is much more resistant to deactivation exhibiting a deactivation rate of about 30 percent that of the catalyst prior to heat treatment.

*Example C*

A catalyst is prepared by depositing 0.6 percent platinum on an eta alumina base and activating it with carbon tetrachloride at 500° F. as described in Example A. This chloride-activated catalyst is contacted with normal hexane at 300° F., 300 p.s.i.g., a 1.0 liquid hourly space velocity, and a 5:1 hydrogen to hydrocarbon ratio. The product with fresh catalyst contains about 90 percent branched chain isomers including 28 mol percent 2,2-dimethyl butane.

*Example D*

A portion of the catalyst of Example C is heated in an open tube for two hours at 1,000° F., with the evolution of hydrogen chloride. The heat-treated catalyst is contacted with normal hexane at the conditions of Example C producing a product containing about 90 percent branched chain isomers including 31.2 percent 2,2-dimethyl butane. The catalyst is employed for 150 hours with no indication of any deactivation. Comparison of Examples C and D reveals that heat treatment improves the activity as evidenced by the greater production of the desired 2,2-dimethyl butane-isomer.

*Example E*

A catalyst comprising 0.6 platinum on eta alumina is heated at 450° F. for 4 hours in the presence of a flowing stream of hydrogen chloride gas. When contacted with normal hexane at the conditions employed in Example C, the catalyst prior to heat and hydrogen chloride treatment produces 25.1 percent 2,2-dimethyl butane and after the heat and hydrogen chloride treatment produces 29.5 percent 2,2-dimethyl butane.

We claim:

1. The method of isomerizing a paraffinic hydrocarbon selected from the group consisting of butanes, pentanes and hexanes which comprises contacting said hydrocarbon at isomerization conditions including a temperature within the range of about 250 to 400° F., a liquid hourly space velocity within the range of 0.5 to 2.0, and a hydrogen to hydrocarbon mol ratio within the range of about 0.10:1 to 5.0:1 with a catalyst comprising alumina, platinum and chlorine, wherein at least a part of said chlorine is introduced into said catalyst by contacting a composite of platinum and alumina with an organic chloride activating agent having an atomic ratio of chlorine to carbon of at least two to one at a temperature within the range of about 300 to 600° F. forming a chlorided composite and thereafter enhancing the activity and stability of said catalyst by heating said chlorided composite to a temperature within the range of 400 to 1,000° F. in contact with hydrogen chloride prior to initial use for said isomerization.

2. The method of preparing a catalyst which comprises compositing platinum with alumina forming a composite comprising a major portion of alumina and about 0.01 to 1.0 percent by weight platinum, contacting said composite with an organic chloride activating agent having an atomic ratio of chlorine to carbon of at least two to one at a temperature within the range of about 300 to 600° F. forming a chlorided composite containing within the range of about 3.0 to 10.0 percent by weight chlorine, thereafter heating said chlorided composite to a temperature within the range of about 400° F. to 1,000° F. in contact with hydrogen chloride to enhance the activity and stability of said catalyst prior to initial use for isomerization, and displacing said hydrogen chloride with an inert atmosphere forming a catalyst containing within the range of about 2.5 to 7.0 weight percent chlorine.

3. The method of claim 2 wherein said chloride activating agent is an organic chloride selected from the group consisting of carbon tetrachloride, chloroform, methylene chloride, phosgene, and trichloracetyl chloride.

4. The method of claim 2 wherein said chloride activating agent is carbon tetrachloride.

5. The method of claim 2 wherein said chlorided composite is heated at 400 to 1000° F. for a period within the range of 2 to 12 hours.

6. The method of claim 2 wherein said hydrogen chloride is evolved from said chlorided composite.

7. The method of claim 2 wherein said hydrogen chloride is passed as a flowing stream in contact with said chlorided composite.

8. The catalyst prepared by the method of claim 2.

References Cited by the Examiner
UNITED STATES PATENTS

| | | | |
|---|---|---|---|
| 2,479,110 | 8/1949 | Haensel | 208—139 |
| 2,481,253 | 9/1949 | Snyder | 252—415 XR |
| 2,642,384 | 6/1953 | Cox | 208—139 |
| 2,785,139 | 3/1957 | Heinemann | 252—415 |
| 2,798,105 | 7/1957 | Heineman et al. | 260—683.65 |
| 2,880,168 | 3/1959 | Feller | 252—411 XR |
| 2,944,097 | 7/1960 | Starnes et al. | 260—683.68 |
| 2,952,716 | 9/1960 | Haensel | 260—683.65 |
| 2,966,528 | 12/1960 | Haensel | 260—683.65 |
| 3,041,272 | 6/1962 | Burk et al. | 208—139 |
| 3,147,229 | 9/1964 | Hinlicky et al. | 252—415 |

FOREIGN PATENTS

| | | |
|---|---|---|
| 1,299,388 | 6/1962 | Goble et al. |

DELBERT E. GANTZ, *Primary Examiner.*

ALPHONSO D. SULLIVAN, *Examiner.*